United States Patent
Choi et al.

(10) Patent No.: US 9,974,103 B2
(45) Date of Patent: May 15, 2018

(54) METHOD AND APPARATUS FOR CONNECTING WITH EXTERNAL DEVICE

(71) Applicant: Samsung Electronics Co., Ltd., Gyeonggi-do (KR)

(72) Inventors: Jaewoo Choi, Gyeonggi-do (KR); In-Hyuk Choi, Seoul (KR); Gyu-Seok Shim, Gyeonggi-do (KR); Ki Soo Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 15/152,148

(22) Filed: May 11, 2016

(65) Prior Publication Data
US 2017/0064754 A1    Mar. 2, 2017

(30) Foreign Application Priority Data
Sep. 1, 2015  (KR) .......................... 10-2015-0123627

(51) Int. Cl.
*H04B 7/00* (2006.01)
*H04W 76/02* (2009.01)
*H04W 4/00* (2018.01)

(52) U.S. Cl.
CPC ......... *H04W 76/023* (2013.01); *H04W 4/008* (2013.01); *H04W 76/028* (2013.01)

(58) Field of Classification Search
CPC . H04W 76/023; H04W 4/008; H04W 76/028; H04W 76/23; H04W 8/245; H04W 24/02; H04W 88/02; H04W 4/02; H04W 88/06; H04W 92/02; H04W 76/02; H04M 1/72525; H04M 1/72522
USPC .......................... 455/41.2, 418, 422.1, 550.1
See application file for complete search history.

(56) References Cited

U.S. PATENT DOCUMENTS

| 2010/0330920 | A1* | 12/2010 | Koskela | ................ H04L 1/1854 |
| | | | | 455/67.11 |
| 2011/0292812 | A1* | 12/2011 | Kim | ...................... H04W 52/34 |
| | | | | 370/242 |
| 2014/0244839 | A1* | 8/2014 | Yoon | ................... H04L 43/0811 |
| | | | | 709/224 |

FOREIGN PATENT DOCUMENTS

| KR | 1020090114018 | 11/2009 |
| KR | 1020100070875 | 6/2010 |

* cited by examiner

*Primary Examiner* — Nhan Le
(74) *Attorney, Agent, or Firm* — The Farrell Law Firm, P.C.

(57) ABSTRACT

Methods and apparatuses are provided for connecting with an external device. A current status of an electronic device is determined when wireless communication with at least one external device is disconnected. A preset time interval corresponding to the current status is determined. An attempt is made to reconnect with the at least one external device based on the preset time interval.

14 Claims, 15 Drawing Sheets

| MOVEMENT | RECONNECTION ATTEMPT TIME INTERVAL |
|---|---|
| STATIONARY | 30sec |
| MOVING | 20sec |

FIG.10

| DISCONNECTION TIME | DISCONNECTION LOCATION | RECONNECTION ATTEMPT TIME INTERVAL | |
|---|---|---|---|
| 00 : 00 ~ 07: 00 | null | 4hours | ~1201 |
| 07 : 01 ~ 09: 00 | null | 1sec | ~1203 |
| 14 : 00 ~ 16: 00 | A | 3mins | ~1205 |

TRAINING DATA TABLE

| DATE | DISCONNECTION TIME | DISCONNECTION LOCATION | RECONNECTION TIME | RECONNECTION LOCATION |
|---|---|---|---|---|
| 6/15 | 14:30:01 | A | 14:33:21 | A' |
| 6/16 | 14:00:20 | A | 14:02:45 | A' |
| 6/17 | 14:20:15 | A | 14:23:17 | A' |
| 6/18 | 15:15:30 | B | 15:17:25 | B' |

METHOD AND APPARATUS FOR CONNECTING WITH EXTERNAL DEVICE

PRIORITY

The present application claims priority under 35 U.S.C. § 119(a) to a Korean Patent Application No. 10-2015-0123627, filed in the Korean Intellectual Property Office on Sep. 1, 2015, the disclosure of which is incorporated herein by reference.

BACKGROUND

1. Field of the Disclosure

The present disclosure relates generally to device connections, and more particularly, to a method and an apparatus for connecting with an external device when the external device is disconnected.

2. Description of the Related Art

An electronic device may connect with an external device such as a smart watch, using short-range wireless communication, such as Bluetooth, so as to exchange various information in real time.

Movement of one of the external device and the electronic device, or signal noise between the two devices, may interrupt communication between the two devices.

As such, the electronic device can be unintentionally disconnected from the external device, for example, when the electronic device leaves a communication range of the external device. While the electronic device and the external device are disconnected from each other, attempts at reconnection are made at preset Bluetooth connection intervals of the electronic device.

When the reconnection of the electronic device and the external device fails, the connection may not be established until the electronic device attempts the reconnection to the external device even though the external device may be reconnectable. Specifically, when the connection interval of the electronic device is long, after the reconnection failure, the electronic device waits an entire connection interval until a next reconnection attempt. For example, when the preset connection interval of the electronic device is 256 seconds, the electronic device may wait up to 256 seconds in order to reattempt the reconnection.

SUMMARY

The present disclosure has been made to address at least the above problems and/or disadvantages and to provide at least the advantages described below. Accordingly, an aspect of the present disclosure provides a method and an apparatus for rapidly reconnecting with an external device, when an electronic device and the external device are disconnected.

According to one aspect of the present disclosure, an apparatus of an electronic device is provided that includes a communication circuit, a memory, and a processor coupled to the communication circuit and the memory. The processor is configured to send, to an external device, one or more signals relating to a connection between the electronic device and the external device based on a first schedule or a second schedule using the communication circuit. The processor is also configured to detect at least one of an event relating to the electronic device and a status of the electronic device. The processor is further configured to send at least one of the one or more signals to the external device according to the at least one of the event and the status.

According to another aspect of the present disclosure, a method is provided for connecting with an external device. A current status of an electronic device is determined when wireless communication with at least one external device is disconnected. A preset time interval corresponding to the current status is determined. An attempt is made to reconnect with the at least one external device based on the preset time interval.

According to another aspect of the present disclosure, an electronic device is provided that includes a communication unit configured to connect with at least one external device via wireless communication. The electronic device also includes a control unit configured to determine a current status of the electronic device when a connection with the at least one external device is interrupted, determine a preset time interval corresponding to the current status, and attempt to reconnect with the at least one external device based on the preset time interval.

BRIEF DESCRIPTION OF THE DRAWINGS

The above and other aspects, features, and advantages of the present disclosure will be more apparent from the following detailed description when taken in conjunction with the accompanying drawings, in which:

FIG. 10 is a table showing a reconnection attempt condition with an external device when an electronic device is active, according to an embodiment of the present disclosure;

FIG. 12 is a table showing training data generated in an electronic device, according to an embodiment of the present disclosure;

FIG. 13 is a table showing generation of training data in an electronic device, according to an embodiment of the present disclosure;

DETAILED DESCRIPTION

Figure 1:
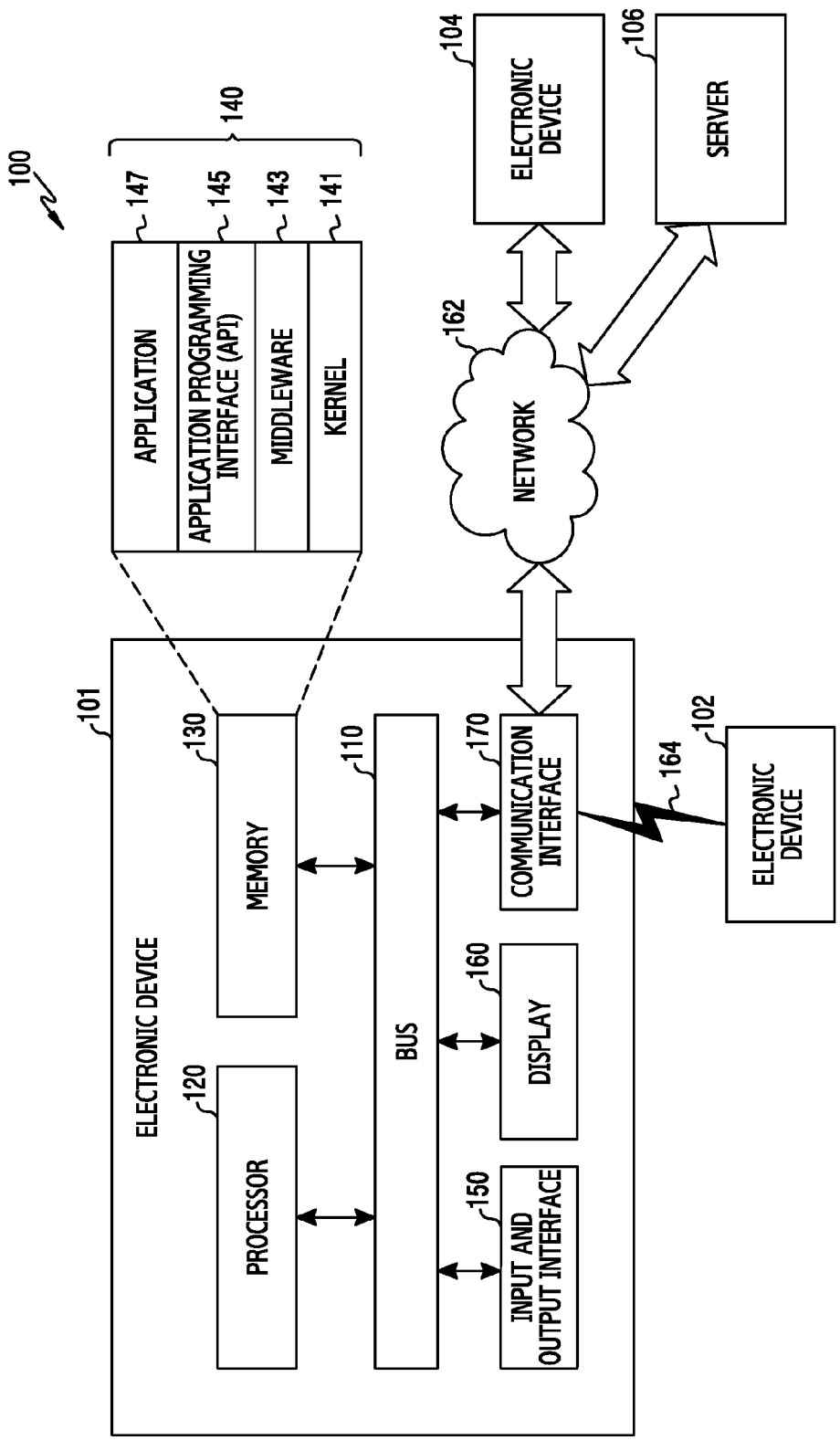
FIG. 1 is a block diagram illustrating a network including an electronic device, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms used herein are defined in consideration of functions of the present disclosure and may vary depending on a user's or an operator's intension and usage. Therefore, the terms used herein should be understood based on the descriptions made herein. In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may mean that the apparatus "can" operate together with another apparatus or component. For example, a phrase "a processor configured (or set) to perform A, B, and C" may be a generic-purpose processor (such as a Central Processing Unit (CPU) or an application processor) that can perform a corresponding operation by executing at least one software program stored at an exclusive processor (such as an embedded processor) for performing a corresponding operation or at a memory device.

An electronic device, according to embodiments of the present disclosure, may be embodied as, for example, at least one of a smart phone, a tablet Personal Computer (PC), a mobile phone, a video phone, an e-book reader, a desktop PC, a laptop PC, a netbook computer, a workstation, a sever, a Personal Digital Assistant (PDA), a Portable Multimedia Player (PMP), an MPEG 3 (MP3) player, a mobile medical equipment, a camera, and a wearable device. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit. The electronic device may be embodied as at least one of, for example, a television, a Digital Versatile Disc (DVD) player, an audio device, a refrigerator, an air-conditioner, a cleaner, an oven, a microwave oven, a washing machine, an air cleaner, a set-top box, a home automation control panel, a security control panel, a media box, a game console, an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data Recorder (FDR), a vehicle infotainment device, electronic equipment for ship (such as, a navigation device for ship and gyro compass), avionics, a security device, a head unit for a vehicle, an industrial or home robot, a drone, an Automated Teller Machine (ATM) of a financial institution, a Point Of Sales (POS) device of a store, and an Internet of Things (IoT) device (such as a light bulb, various sensors, a sprinkler device, a fire alarm, a thermostat, a street light, a toaster, sports equipment, a hot water tank, a heater, and a boiler).

According to an embodiment, the electronic device may be embodied as at least one of a portion of furniture, building/construction or vehicle, an electronic board, an electronic signature receiving device, a projector, and various measuring devices (such as, water supply, electricity, gas, or electric wave measuring device). An electronic device, according to an embodiment, is a flexible electronic device or a combination of two or more of the foregoing various devices. An electronic device, according to an embodiment of the present disclosure, is not limited to the foregoing devices may be embodied as a newly developed electronic device. The term "user", as used herein, can refer to a person using an electronic device or a device using an electronic device (e.g., an artificial intelligence electronic device).

Referring initially to FIG. 1, a block diagram illustrates a network including an electronic device, according to an embodiment of the present disclosure An electronic device 101 resides in a network 100. The electronic device 101 includes a bus 110, a processor 120, a memory 130, an input/output interface 150, a display 160, and a communication interface 170. The electronic device 101 may be provided without at least one of the components, or may include at least one additional component. The bus 110 can include a circuit for connecting the components 120 to 170 and delivering communication signals (e.g., control messages or data) therebetween. The processor 120 can include one or more of a CPU, an application processor, and a Communication Processor (CP). The processor 120, for example, can perform an operation or data processing with respect to control and/or communication of at least another component of the electronic device 101.

The memory 130 can include a volatile and/or nonvolatile memory. The memory 130, for example, can store commands or data relating to at least another component of the electronic device 101. According to an embodiment, the memory 130 can store software and/or a program 140. The program 140 includes at least one of a kernel 141, middleware 143, an Application Programming Interface (API) 145, and an application program (or "application") 147. At least part of the kernel 141, the middleware 143, or the API 145 can be referred to as an Operating System (OS). The kernel 141 can control or manage system resources (e.g., the bus 110, the processor 120, or the memory 130) used for performing operations or functions implemented by the other programs (e.g., the middleware 134, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 132 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can deliver commands or data inputted from a user or another external device to at least one other component of the electronic device 101, or output commands or data inputted from the at least one other component of the electronic device 101 to a user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part.

The communication interface 170, for example, can set a communication between the electronic device 101 and an external device (e.g., a first external electronic device 102, a second external electronic device 104, or a server 106). For example, the communication interface 170 can communicate with the second external electronic device 104 or the server 106 over a network 162 through wireless communication or wired communication.

The wireless communication, for example, can at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. The wireless communication can include, for example, at least one of Wireless Fidelity (WiFi), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (Beidou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include a telecommunications network, such as computer network (e.g., LAN or WAN), Internet, and telephone network.

Each of the first and second external electronic devices 102 and 104 can be of the same as or of a different type from that of the electronic device 101. According to embodiments of the present disclosure, all or part of operations executed in the electronic device 101 can be executed by another or a plurality of electronic devices (e.g., the first external electronic device 102, the second external electronic device 104, or the server 106). When the electronic device 101 is to perform a function or service automatically or by request, instead of performing the function or the service by the electronic device 101, the electronic device 101 can request at least part of a function relating thereto from another device. The other electronic device can perform the requested function or an additional function and deliver its result to the electronic device 101. The electronic device 101 can provide the requested function or service by processing the received result. In doing so, for example, cloud computing, distributed computing, or client-server computing techniques can be used.

Figure 2:
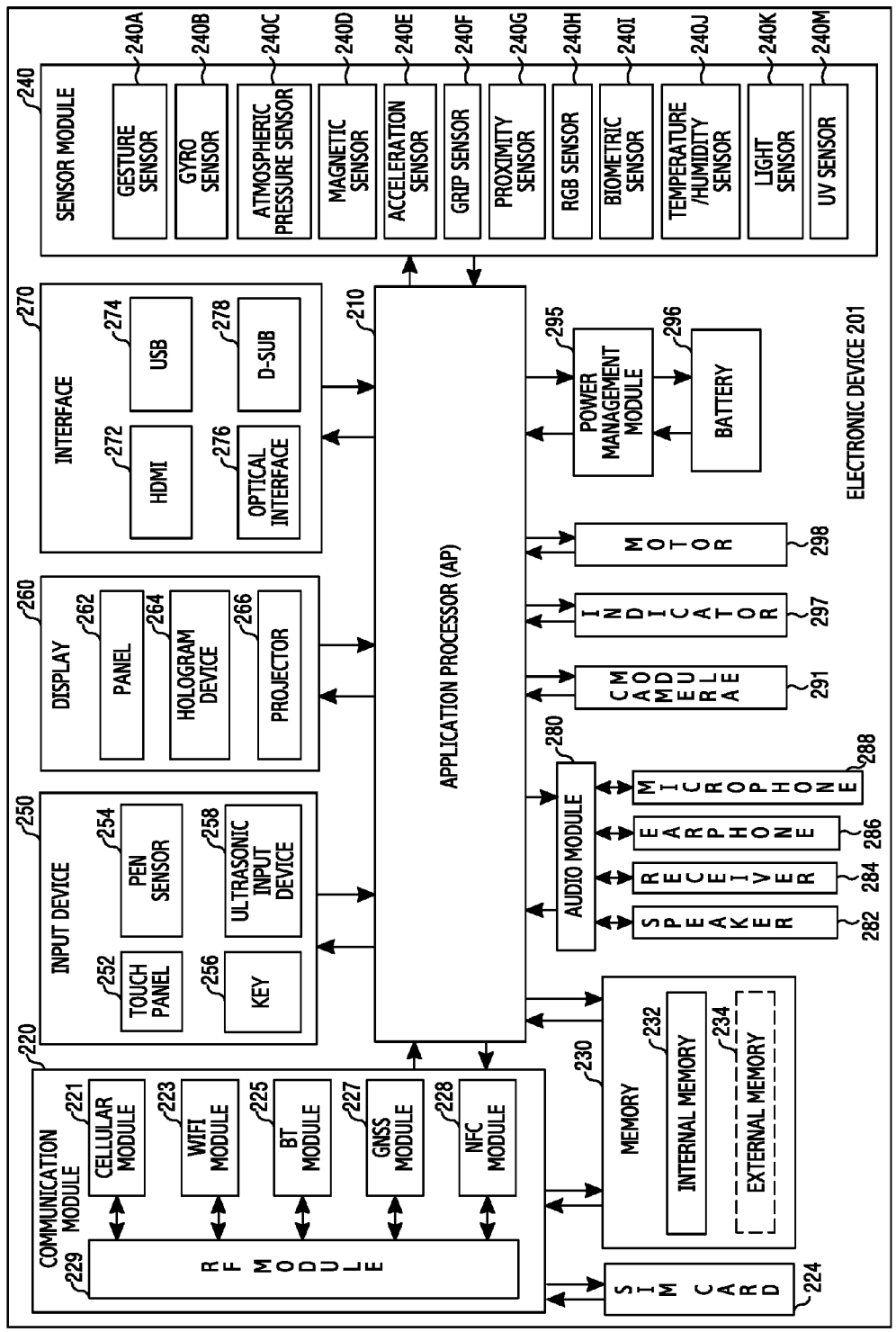
FIG. 2 is a block diagram illustrating an electronic device, according to an embodiment of the present disclosure.

FIG. 2 is a block diagram illustrating an electronic device, according to an embodiment of the present disclosure. An electronic device 201, for example, can include all or part of the above-described electronic device 101 of FIG. 1. The electronic device 201 includes one or more processors (e.g., an AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298. The processor 210, for example, can control a plurality of hardware or software components connected to the processor 210, and also can perform various data processing and operations by executing an operating system or an application program. The processor 210 can be implemented with a System on Chip (SoC), for example. The processor 210 can further include a Graphic Processing Unit (GPU) and/or an image signal processor. The processor 210 can include at least part of the components shown in FIG. 2 (e.g., a cellular module 221). The processor 210 can load commands or data received from at least one other component (e.g., a nonvolatile memory) into a volatile memory, process them, and store various data in the nonvolatile memory.

The communication module 220 can have the same or similar configuration to the communication interface 170 of FIG. 1. The communication module 220 includes, for example, the cellular module 221, a WiFi module 223, a Bluetooth (BT) module 225, a GNSS module 227, an NFC module 228, and an RF module 229. The cellular module 221, for example, can provide voice call, video call, Short Message Service (SMS), or Internet service through a communication network. The cellular module 221 can identify and authenticate the electronic device 201 in a communication network by using the SIM card 224. The cellular module 221 can perform at least part of a function that the processor 210 provides. The cellular module 221 can further include a CP. Two or more of the WiFi module 223, the BT module 225, the GNSS module 227, and the NFC module 228 can be included in one Integrated Circuit (IC) or an IC package. The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WiFi module 223, the BT module 225, the GNSS module 227, and the NFC module 228 can transmit/receive an RF signal through an additional RF module. The SIM card 224, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130) includes at least one of an internal memory 232 and an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus, convert the measured or detected information into electrical signals. The sensor module 240 includes at least one of a gesture sensor 240A, a gyro sensor 240B, an atmospheric pressure sensor 240C, a magnetic sensor 240D, an acceleration sensor 240E, a grip sensor 240F, a proximity sensor 240E a color sensor 240H (e.g., a Red, Green, Blue (RGB) sensor), a bio sensor 240I, a temperature/humidity sensor 240J, an illumination sensor 240K, and an Ultra Violet (UV) sensor 240M. Additionally/alternately, the sensor module 240 can include an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240, and thus, control the sensor module 240 while the processor 210 is sleeping.

The input device 250 includes at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone 288 and check data corresponding to the detected ultrasonic waves.

The display 260 (e.g., the display 160 of FIG. 1) includes at least one of a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The hologram device 264 can show three-dimensional images in the air by using the interference of light. The projector 266 can display an image by projecting light on a screen. The screen, for example, can be placed inside or outside the electronic device 201. The interface 270 can include an HDMI 272, a USB 274, an optical interface 276, or a D-subminiature (D-sub) 278, for example. The interface 270 can be included in the communication interface 170 of FIG. 1, for example. Additionally or alternately, the interface 270 can include a Mobile High-Definition Link (MHL) interface, a SD card/MMC interface, or an Infrared Data Association (IrDA) standard interface.

The audio module 280, for example, can convert sound into electrical signals and convert electrical signals into sounds. At least some components of the audio module 280 can be included in the input/output interface 150 of FIG. 1, for example. The audio module 280 can process sound information inputted or outputted through a speaker 282, a receiver 284, an earphone 286, or the microphone 288. The camera module 291, as a device for capturing still images and videos, can include one or more image sensors (e.g., a front sensor or a rear sensor), a lens, an Image Signal Processor (ISP), or a flash (e.g., an LED or a xenon lamp). The power management module 295, for example, can manage the power of the electronic device 201. According to an embodiment of the present disclosure, the power management module 295 can include a Power Management IC (PMIC), a charger IC, or a battery gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining amount of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB) or Digital Video Broadcasting (DVB). Each of the above-described components of the electronic device can be configured with at least one component and the name of a corresponding component can vary according to the kind of an electronic device. According to an embodiment of the present disclosure, the electronic device 201 can be configured to include at least one of the above-described components or an additional component, or to not include some of the above-described components. Additionally, some of components in an electronic device are configured as one entity, so that functions of previous corresponding components are performed identically.

Figure 3:
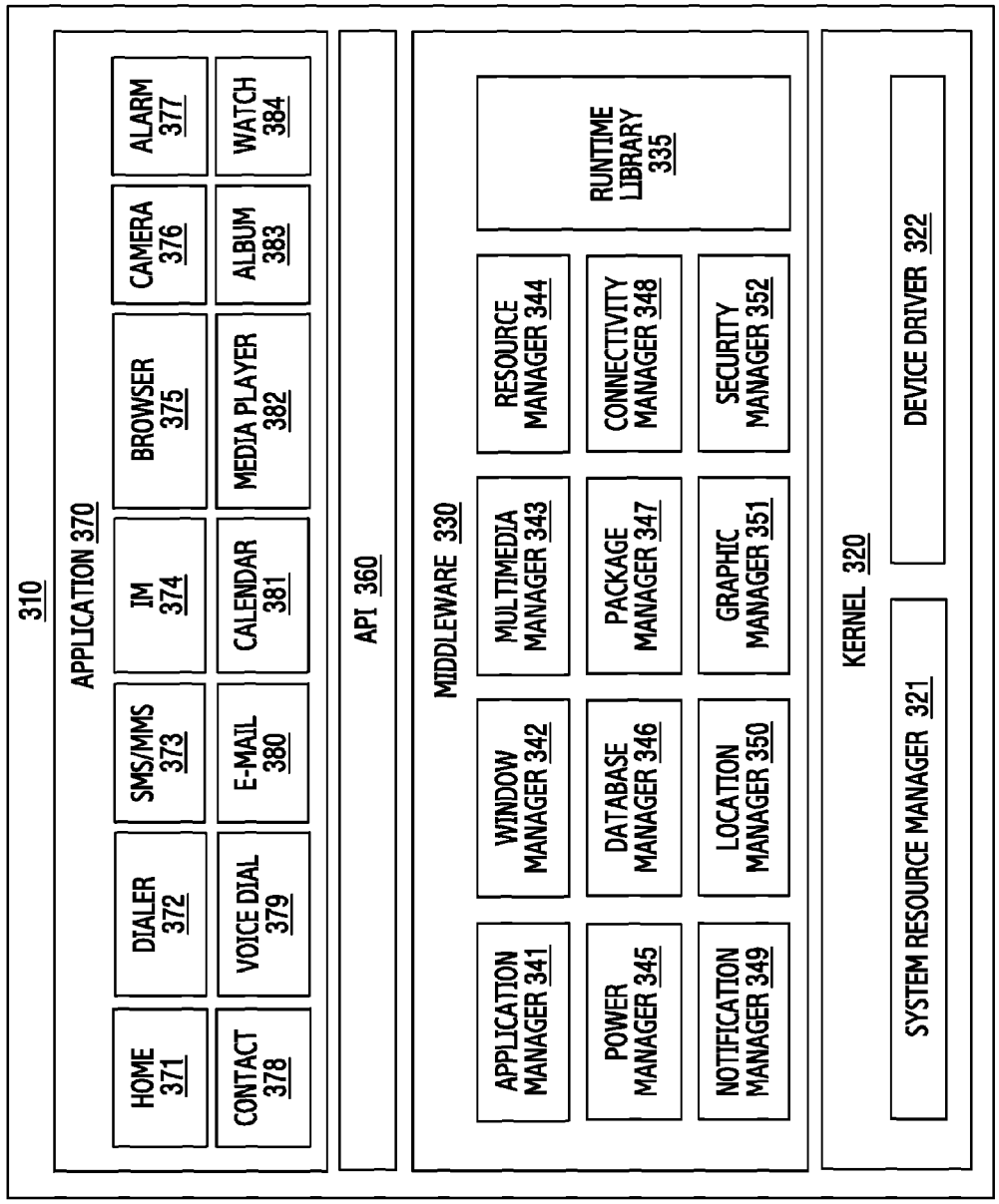
FIG. 3 is a block diagram illustrating a program module, according to an embodiment of the present disclosure.

FIG. 3 is a block diagram illustrating a program module, according to an embodiment of the present disclosure. A program module 310 (e.g., the program 140 of FIG. 1) can include an OS for controlling a resource relating to an electronic device (e.g., the electronic device 101 of FIG. 1) and/or various applications (e.g., the application program 147 of FIG. 1) running on the OS. Referring to FIG. 3, the program module 310 includes a kernel 320 (e.g., the kernel 141 of FIG. 1), a middleware 330 (e.g., the middleware 143 of FIG. 1), an API 360 (e.g., the API 145 of FIG. 1), and an application 370 (e.g., the application program 147 of FIG. 1). At least part of the program module 310 can be preloaded on an electronic device or can be downloaded from an external electronic device 102, 104, or the server 106 of FIG. 1.

The kernel 320 includes at least one of a system resource manager 321 and device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver, an audio driver, or an Inter-Process Communication (IPC) driver. The middleware 330, for example, can provide a function that the application 370 commonly utilizes, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running. The runtime library 335 can manage input/output, manage memory, or process an arithmetic function. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 3740 or a memory space. The power manager 345 can manage the battery or power of the battery and provide power information for an operation of the electronic device. The power manager 345 can operate together with a Basic Input/Output System (BIOS). The database manager 346 can create, search, or modify a database used in the application 370. The package manager 347 can manage installation or updating of an application distributed in a package file format.

The connectivity manger 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components.

The API 360, as a set of API programming functions, can be provided as another configuration according to the OS. For example, one API set can be provided for each platform, or at least two API sets can be provided for each platform.

The application 370 includes at least one of a home 371, a dialer 372, an SMS/Multimedia Messaging System (MMS) 373, an Instant Message (IM) 374, a browser 375, a camera 376, an alarm 377, a contact 378, a voice dial 379, an e-mail 380, a calendar 381, a media player 382, an album 383, a clock 384, health care (e.g., measure an exercise amount or blood sugar level), or environmental information (e.g., air pressure, humidity, or temperature information) provision application. The application 370 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210 of FIG. 2), or a combination of at least two of them, and include a module, a program, a routine, a set of instructions, or a process for executing one or more functions.

The term "module", as used herein, can imply a unit including hardware, software, and firmware, or any suitable combination. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module, according to an embodiment of the present disclosure, can include at least one of an Application-Specific Integrated Circuit (ASIC) chip, a Field-Programmable Gate Arrays (FPGAs), and a programmable-logic device, which are known or will be developed and which perform certain operations.

At least some parts of a device (e.g., modules or functions thereof) or a method (e.g., operations), based on embodiments of the present disclosure, can be implemented with an instruction stored in a non-transitory computer-readable storage medium (e.g., the memory 130 of FIG. 1) as a program module. When the instruction is executed by one or more processors (e.g., the processor 120 of FIG. 1), the one or more processors can perform a function corresponding to the instruction. The non-transitory computer readable recording medium can include, for example, a hard disk, a floppy disc, a magnetic medium (e.g., a magnetic tape), an optical storage medium (e.g., a Compact Disc-ROM (CD- ROM) or a DVD, a magnetic-optic medium (e.g., a floptical disc)), and an internal memory. The instruction can include code created by a compiler or code executable by an interpreter. The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

Figure 4:
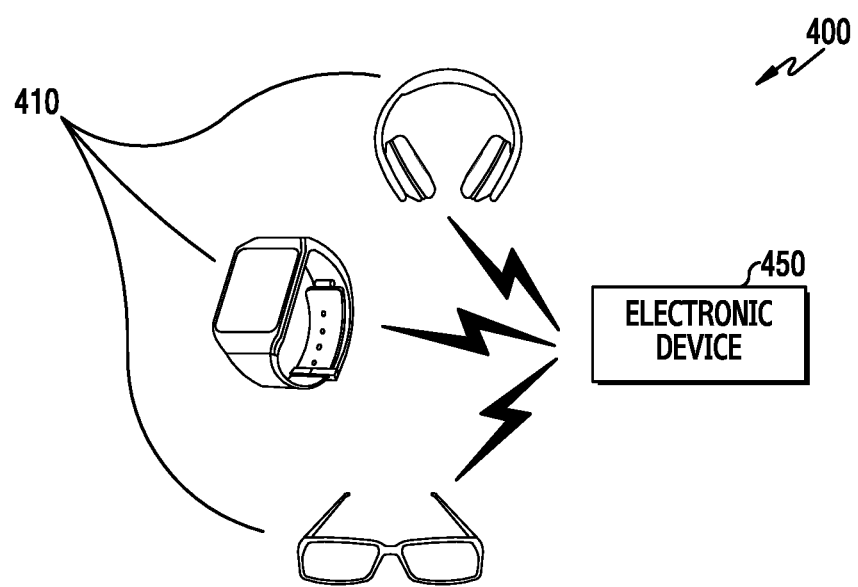
FIG. 4 is a diagram illustrating a system including an external device and an electronic device, according to an embodiment of the present disclosure.

FIG. 4 is a diagram illustrating a system including an external device and an electronic device, according to an embodiment of the present disclosure. Referring to FIG. 4, a system 400 includes at least one external device 410 and an electronic device 450.

The at least one external device 410 can be connected to the electronic device 450 using short-range wireless communication. The external device 410 and the electronic device 450 can transmit and receive data through the short-range wireless communication. The external device 410 can include a wearable device such as, for example, a smart watch, a headset, smart glasses, or an electronic device. The external device 410 can be connected to the electronic device 450 using Bluetooth. The external device 410 can adopt Serial Port Profile (SPP), which is the basic Bluetooth profile. Hence, the external device 410 and the electronic device 450 can communicate with each other using Bluetooth regardless of their manufacturer. While the short-range wireless communication is described with respect to Bluetooth for ease in understanding, it can be replaced with any type of short-range wireless communication, such as Zigbee.

When the electronic device 450 is disconnected from the external device 410 without receiving a disconnection signal, the electronic device 450 can reconnect the communication with the external device 410 at preset time intervals.

Figure 5:
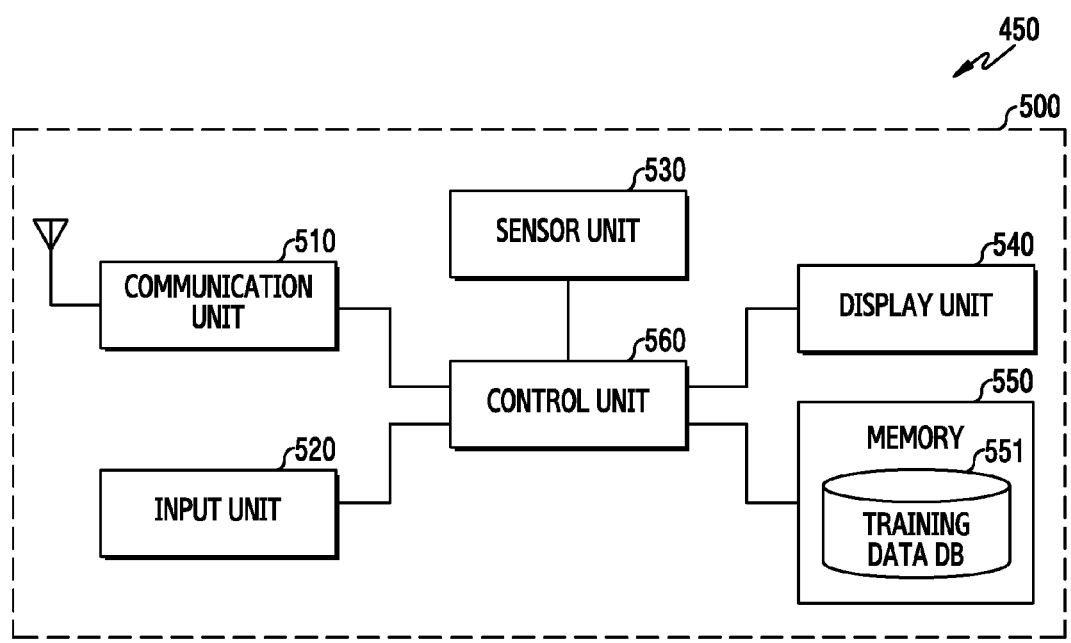
FIG. 5 is a block diagram illustrating an electronic device for connecting with an external device, according to an embodiment of the present disclosure.

FIG. 5 is a block diagram illustrating an electronic device for connecting with an external device, according to an embodiment of the present disclosure. Referring to FIG. 5, the electronic device 450 includes a communication unit 510, an input unit 520, a sensor unit 530, a display unit 540, a memory 550, and a control unit 560.

The communication unit 510 can communicate with the at least one external device 410 of FIG. 4. The communication unit 510 can communicate with the at least one external device 410 using various communication methods. The communication unit 510 can perform at least one of wireless communication and wired communication. The communication unit 510 can access at least one of a mobile communication network and a data communication network. The communication unit 510 can perform Bluetooth communication.

The input unit 520 can generate input data in response to a user input of the electronic device 450. The input unit 520 can include at least one input means. The input unit 520 can include a key pad, a dome switch, a button, a touch panel, and a jog & shuttle.

The sensor unit 530 can detect a movement state (e.g., movement, moving speed, and the like) and a current location of the electronic device 450. The sensor unit 530 can include at least one of a GPS, a gyro sensor, an acceleration sensor, and a geomagnetic sensor.

The display unit 540 can display a screen based on the operation of the electronic device 450. The display unit 540 can include an LCD, an LED display, an OLED display, a MEMS display, or an electronic paper display. The display unit 540 can be combined with the input unit 540 and realized as a touch screen.

The memory 550 can store operation programs of the electronic device 450. The memory 550 can store the time interval for attempting the communication reconnection with the external device 410 according to the status of the electronic device 450. When an application processor is active or asleep, the memory 550 can store a time interval for attempting the communication reconnection with the external device 410. When the application processor is active, the memory 550 can store a time interval for attempting the communication reconnection with the external device 410 according to the movement or the speed of the electronic device 450.

When the application processor is active, the memory 550 can store training data for attempting the reconnection with the external device 410. The training data can be gathered from a life pattern of the user. The training data can be generated based on a time duration consumed from the communication disconnection to the successful reconnection between the electronic device 450 and the external device 410. The training data can include a location of the electronic device 450 when the communication is disconnected and a location of the electronic device 450 when the reconnection is successful. The memory 550 can include a training data DataBase (DB) 551 for storing the training data.

The memory 550 can store the location of the electronic device 450 and WiFi access point information of the electronic device 450.

When disconnected from the at least one external device 410, the control unit 560 can check the current status of the at least one electronic device 450 and determine a preset time interval according to the current status. The control unit 560 can reconnect the communication with the at least one external device 410 based on the determined time intervals. The operations of the control unit 560 are described in greater detail below with reference to FIG. 6.

Figure 6:
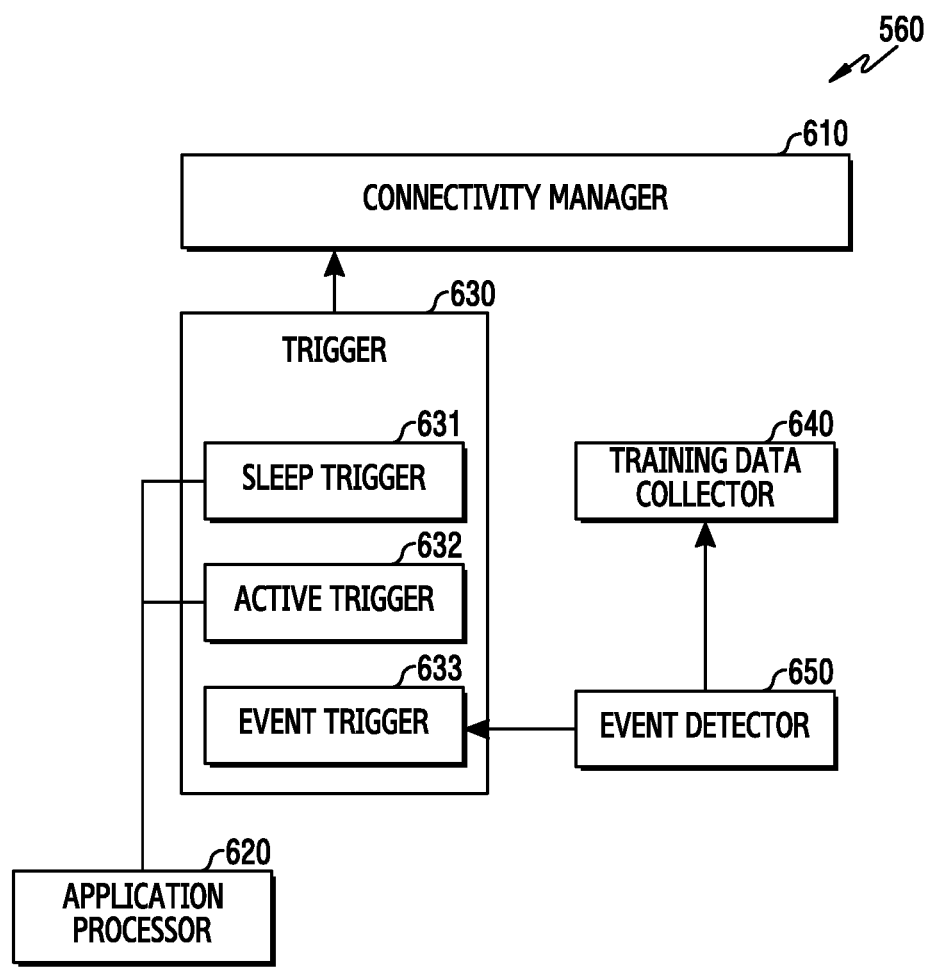
FIG. 6 is a block diagram illustrating a control unit of an electronic device, according to an embodiment of the present disclosure.

FIG. 6 is a block diagram illustrating a control unit of an electronic device, according to an embodiment of the present disclosure. Referring to FIG. 6, the control unit 560 includes a connectivity manager 610, an application processor 620, a trigger 630, a training data collector 640, and an event detector 650. The trigger 630 includes a sleep trigger 631, an active trigger 632, and an event trigger 633.

The connectivity manager 610 controls the short-range wireless communication connection with at least one external device 410. The connectivity manager 610 can attempt the communication reconnection with the external device 410 using the time interval for attempting the communication reconnection with the external device 410 as stored in the memory 550.

The application processor 620 can execute an application stored in the memory 550. The application processor 620 can be activated for application execution, battery charging, call reception, message reception, and activation of the display unit 540. The application processor 620 sleeps when the display unit 540 is deactivated, while the battery is not charging, or when the application is not running.

When the time interval for attempting the communication reconnection with the at least one external device 410 arrives based on the current status of the electronic device 450, the trigger 630 can send a triggering signal to the connectivity manager 610. When a plurality of external devices 410 are disconnected, the trigger 630 can send a triggering signal to the connectivity manager 610 so as to reconnect the communication with an external device 410 having the shortest time interval for attempting the communication reconnection.

When the at least one external device 410 is disconnected and the application processor 620 is asleep, the sleep trigger 631 can check the time interval for attempting the communication reconnection with the at least one external device 410. At the corresponding time intervals, the sleep trigger 631 can send a triggering signal to the connectivity manager 610.

The sleeping application processor 620 can enter a wakeup mode at time intervals of a constant multiple (1, 2, 4, 8, 16 . . . , and 256 seconds). At the preset time interval (e.g., 256 seconds), the sleep trigger 631 can switch the application processor 620 to the wakeup mode and send a triggering signal to the connectivity manager 610.

The sleep trigger 631 can send a triggering signal to the connectivity manager 610 for threshold times at preset time intervals (e.g., 128 seconds). When the communication is not reconnected with the external device 410 even after the triggering signal is transmitted for the threshold times, the sleep trigger 631 can send a triggering signal to the connectivity manager 610 at time intervals of the constant multiple (1, 2, 4, 8, 16, . . . , and 256 seconds). When the communication is not reconnected with the at least one external device 410 after the triggering signal is transmitted at the time intervals of the constant multiple, the sleep trigger 631 can send a triggering signal to the connectivity manager 610 at maximum time intervals (e.g., 256 seconds).

When the application processor 620 is active upon disconnection from the at least one external device 410, the active trigger 632 can determine the time interval for reattempting the communication reconnection with the external device 410. The active trigger 632 can confirm sensing information of the electronic device 450 acquired through the sensor unit 530. The sensing information can include the movement or the speed of the electronic device.

Based on the sensing information, the active trigger 632 can determine the preset reconnection attempt time interval according to the movement or the speed of the electronic device 450. At the determined time interval, the active trigger 632 can send a triggering signal to the connectivity manager 610. Upon receiving the triggering signal, the connectivity manager 610 can reconnect the communication with the external device 410. For example, when the electronic device 450 is stationary, the active trigger 632 can send a triggering signal to the connectivity manager 610 every 30 seconds. When the electronic device 450 is moving, the active trigger 632 can send a triggering signal to the connectivity manager 610 every 20 seconds.

The active trigger 632 can determine a reconnection attempt condition, which includes at least one of the time and the location of the disconnection from the external device 410. The active trigger 632 can compare the reconnection attempt condition with the training data stored in the memory 550. When detecting the training data corresponding to the reconnection attempt condition, the active trigger 632 can send a triggering signal to the connectivity manager 610 at reconnection attempt time intervals corresponding to the training data.

When the connection with the at least one external device 410 is interrupted during battery charging or at a high battery capacity (e.g., over 80%), the active trigger 632 can send a triggering signal to the connectivity manager 610 at time intervals (e.g., 10 seconds). In so doing, the time interval for sending the triggering signal from the active trigger 632 to the connectivity manager 610 is arbitrary for ease in understanding, and it is noted that the time interval can change based on various conditions, such as, for example, the remaining battery capacity or the moving speed.

When the external device 410 is disconnected and a particular event detection signal is received from the event detector 650, the event trigger 633 can send a triggering signal to the connectivity manager 610 according to the detected event. The event trigger 633 can send a one-time triggering signal to the connectivity manager 610 regardless of an event type. The event trigger 633 can determine the type of the event. The event trigger 633 can send a triggering signal to the connectivity manager 610 according to the determined event type at preset time intervals.

The event trigger 633 can operate according to a preset event stored in the memory 550, such as, for example, detecting WiFi AP information, GPS information, or charger connection information. The event trigger 633 can operate in response to an event stored in the training data DB 551.

When the communication reconnection with the at least one external device 410 is completed, the training data collector 640 can determine the reconnection attempt condition including a date, a time, and a location of the disconnection. The training data collector 640 can gather training data including a reconnection complete condition including a date, a time, and a location of the completed reconnection. The training data can be added and updated by the user of the electronic device 450. The training data collector 640 can generate a training data table with such conditions, and send the training data table to the training data DB 551 through the connectivity manager 610.

The training data collector 640 can generate a training data table with the event type and the event occurrence time received from the event detector 650. The training data collector 640 can send the generated training data table to the training data DB 551.

The event detector 650 can detect whether a particular event occurs after disconnection from the at least one external device 410. The event detector 650 can send the detection result to the event trigger 633. The event detector 650 can send the type and the time of the particular event to the training data collector 640.

The event detector 650 can detect events such as activation of the display unit 540, battery charging, Bluetooth activation, airplane mode deactivation, access to the disconnection location, and access to the AP at the disconnection.

While the components of FIG. 6 are shown to be included in the control unit 560, such components can also be included in the memory 550 in other embodiments of the present disclosure.

An electronic device 450 for connecting with an external device 410 can include a communication unit 510 for connecting wireless communication with at least one external device 410, and a control unit 560 for determining a current status of the electronic device 450 when the connection is interrupted, determining a preset time interval corresponding to the current status, and reconnecting with the external device 410 based on the determined time interval.

The control unit 560 can determine whether the current status is a sleep status or an active status. The control unit 560 can determine a reconnection attempt condition with the external device when the current status is the active status, and determine whether there is training data corresponding to the reconnection attempt condition. The control unit 560 can determine a time interval corresponding to the training data when there is the training data.

The control unit 560 can reconnect with the external device 410 based on a preset time interval when there is no training data, and the control unit 560 can store the training data by mapping the reconnection attempt condition with a reconnection complete condition when completing the reconnection with the external device 410. The reconnection attempt condition can include at least one of a disconnection time and a disconnection location of the external device 410. The reconnection complete condition can include at least one of a reconnection time and a reconnection location in relation to the external device 410.

The control unit 560 can determine whether the electronic device 450 moves when the current status is the active status, and determines a time interval corresponding to the movement. When detecting a particular event, the control unit 560 can reconnect with the external device.

The control unit 560 can reconnect with the external device 410 according to the particular event when detecting a particular event during reconnection with the external device 410.

The control unit 560 can reconnect with an external device of the shortest time interval when a plurality of external devices 410 is disconnected.

Figure 7:
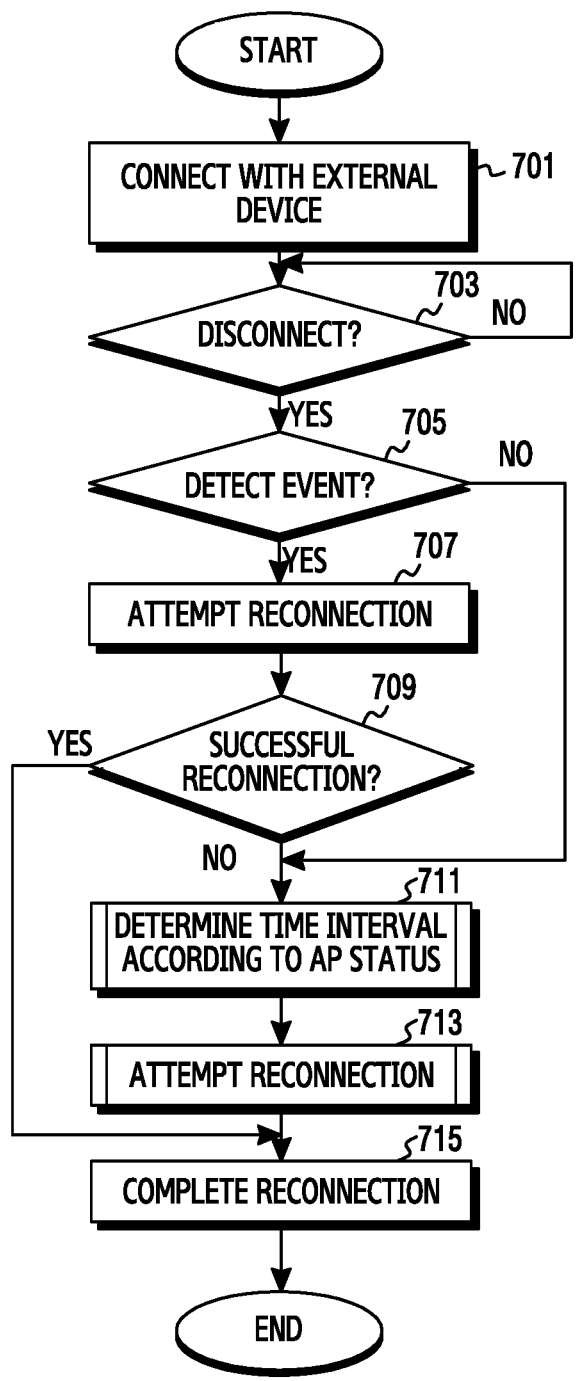
FIG. 7 is a flowchart illustrating a method of an electronic device for connecting with an external device, according to an embodiment of the present disclosure.

FIG. 7 is a flowchart illustrating a method of an electronic device for connecting with an external device, according to an embodiment of the present disclosure.

Referring to FIG. 7, in step 701, the control unit 560 connects with the at least one external device 410 via short-range wireless communication. The short range wireless communication can include the Bluetooth communication, and the external device 410 can adopt SPP (Serial Port Profile) which is the basic Bluetooth profile. The at least one external device 410 and the electronic device 450 can communicate with each other using the short-range wireless communication regardless of their manufacturer.

In step 703, it is determined whether there is a disconnection of the short-range wireless communication. If there is no disconnection, the control unit 560 maintains its connection with the at least one external device. The disconnection can indicate an unintentional wireless communication disconnection due to an external environment. For example, the communication can be disconnected when the external device 450 travels outside the communication range of the at least one external device 410, or when an external noise interrupts the wireless communication.

If there is a disconnection of the short-range wireless communication, the control unit 560 determines whether an event occurs, in step 705. When an event is detected, the control unit 560 attempts communication reconnection with the external device 410 according to the event, in step 707. The control unit 560 can attempt the one-time communication reconnection with the at least one external device 410 regardless of the event type. The control unit 560 can determine the type of the event and attempt the communication reconnection at preset time intervals according to the determined type. When the number of the communication reconnections is preset, the control unit 560 can attempt the communication reconnection for the preset number of times at the preset time intervals.

The event type can include activation of the display unit 540, battery charging, Bluetooth activation, airplane mode deactivation, access to the disconnection location, and access to the AP at the disconnection.

In step 709, it is determined whether reconnection was successful. When the reconnection with the at least one external device 410 is successful, the control unit 560 completes the reconnection with the external device 410, in step 715 and begins communication with the external device 410. When reconnection with the at least one external device 410 is not successful, the control unit 560 can store the detected event type, the disconnection time, the disconnection location, the reconnection success time, and the reconnection success location, as the training data.

When it is determined that reconnection with the at least one external device 410 fails in step 709, and when an event is not detected in step 705, the control unit 560 determines the time interval for attempting communication reconnection with the at least one external device 410, according to the status of the application processor 620, in step 711. Step 711 is described in greater detail below with reference to FIG. 8.

In step 713, the control unit 560 attempts communication reconnection with the at least one external device 410 using the time interval determined in step 711. Step 713 is described in greater detail below with reference to FIG. 9. Upon reconnection in step 713, the control unit 560 proceeds to step 715 to complete reconnection, as described above.

Figure 8:
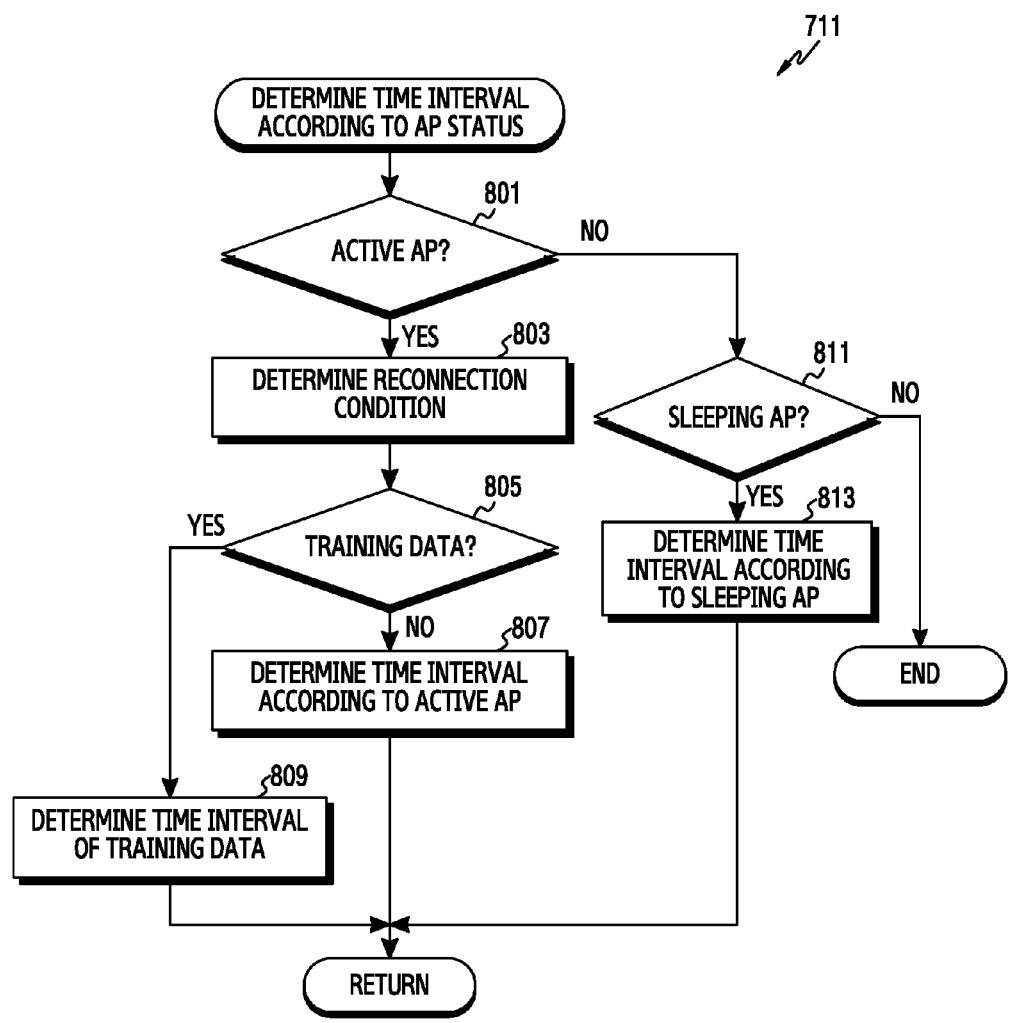
FIG. 8 is a flowchart illustrating a method for determining a time interval for attempting reconnection with an eternal device based on a current status of an electronic device, according to an embodiment of the present disclosure.

FIG. 8 is a flowchart illustrating a method for checking a time interval for attempting reconnection with an eternal device according to a current status of an electronic device, according to an embodiment of the present disclosure. Referring to FIG. 8, the control unit 560 determines whether the application processor 620 is active, in step 801. When the application processor 620 is active, the control unit 560 determines the reconnection attempt condition, in step 803. The reconnection attempt condition can include at least one of the communication disconnection time and the communication disconnection location of the electronic device 450 and the at least one external device 410.

In step 805, the control unit 560 determines whether there is training data corresponding to the reconnection attempt condition. When there is training data corresponding to the reconnection attempt condition, the control unit 560 determines the training data (e.g., the reconnection attempt time interval) corresponding to the reconnection attempt condition, and proceeds to step 713 of FIG. 7, which is described in greater detail below with reference to FIG. 9.

When it is determined that there is no training data corresponding to the reconnection attempt condition in step 805, the control unit 560 determines the reconnection attempt time interval corresponding to the active application processor 620. To identify the reconnection attempt time interval, the control unit 560 can obtain the sensing information of the electronic device 450 acquired from the sensor 530. The sensing information can include the movement of the electronic device.

When detecting the movement of the electronic device 450 according to the sensing information, the control unit 560 can determine the preset reconnection attempt time interval of the moving electronic device 450. When not detecting the movement of the electronic device 450, the control unit 560 can determine the preset reconnection attempt time interval of the stationary electronic device 450. The control unit 560 the proceeds to step 713 of FIG. 7.

When it is determined that the AP is not active in step 801, it is determined whether the AP is sleeping, in step 811. When the application processor 620 is sleeping, the control unit 560 determines the reconnection attempt time interval corresponding to the sleeping status, and then proceeds to step 713 of FIG. 7. When the application is not sleeping, the methodology terminates.

Figure 9:
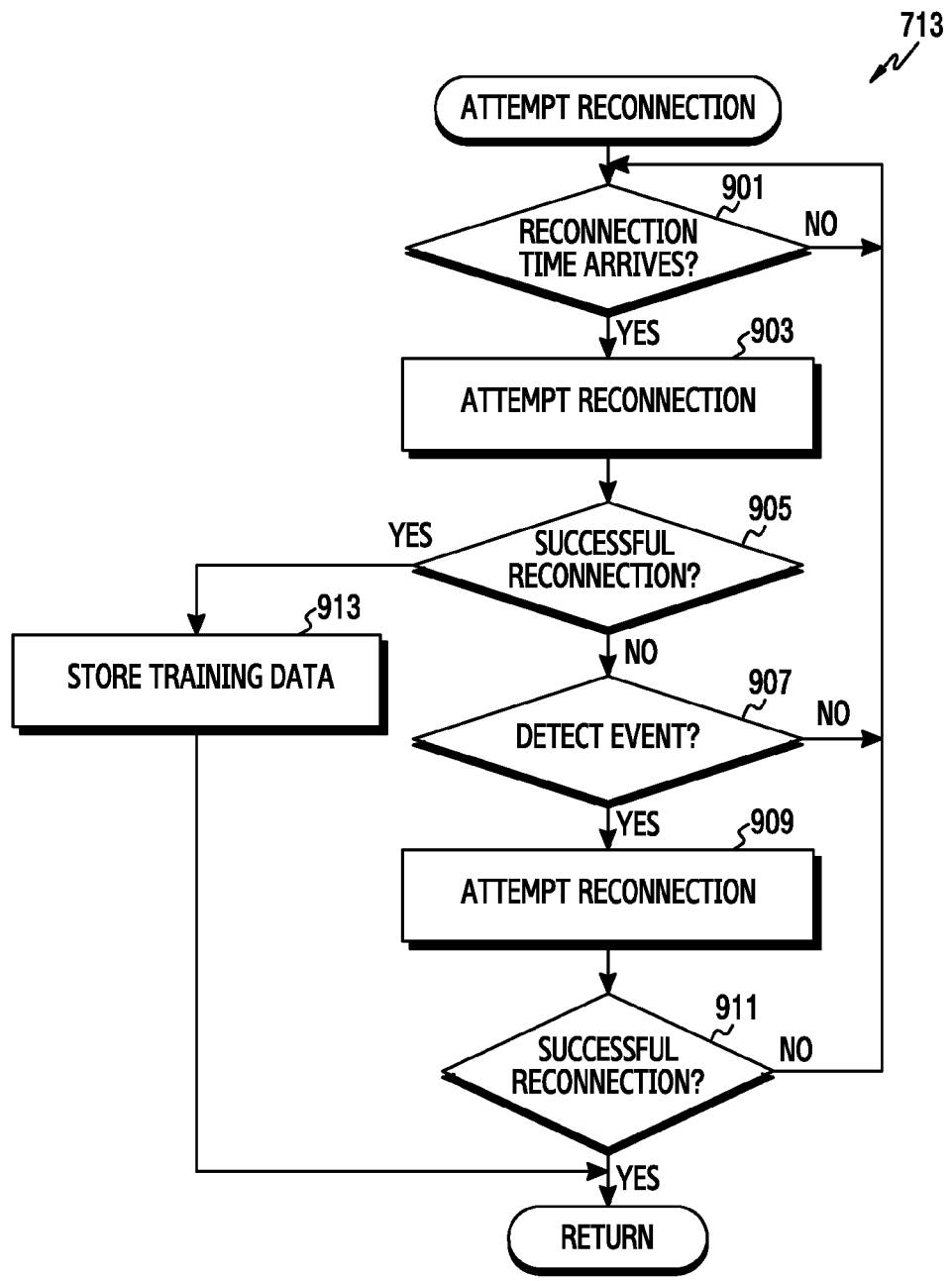
FIG. 9 is a flowchart illustrating a method for attempting reconnection with an eternal device based on the determined reconnection attempt time, according to an embodiment of the present disclosure.

FIG. 9 is a flowchart illustrating a method for attempting reconnection with an external device according to the determined reconnection attempt time, according to an embodiment of the present disclosure. Referring to FIG. 9, the control unit 560 determines whether the reconnection time corresponding to the reconnection attempt time interval determined in one of the operations 807, 809, and 813 of FIG. 8 arrives, in step 901. When the reconnection time arrives, the control unit 560 attempts to reconnect communication with the at least one external device 410, in step 903. In step 905, it is determined whether the reconnection attempt is successful. When the communication reconnection with the at least one external device 410 is successful, the control unit 560 stores the training data, in step 913, and proceeds to step 715 of FIG. 7. When completing the communication reconnection with the external device 410, the control unit 410 can store the training data by mapping the reconnection attempt condition with the reconnection complete condition.

When the communication reconnection with the external device 410 fails, the control unit 560 determines whether an event is detected. The event can include activation of the display unit 540, battery charging, Bluetooth activation, airplane mode deactivation, access to the disconnection location, and access to the AP at the disconnection. When an event is not detected, the control unit returns to step 901.

When an event is detected, the control unit 560 attempts communication reconnection with the at least one external device 410, in step 909. The control unit 560 can attempt the one-time communication reconnection with the external device 410 regardless of the event type. The control unit 560 can determine the event type, and thus, attempt the communication reconnection at preset time intervals based on the type. When the number of the communication reconnections is preset, the control unit 560 can attempt the communication reconnection for the preset times at the preset time intervals. When the event includes the preset reconnection attempt time interval, the control unit 560 can attempt the communication reconnection with the at least one external device 410 for the preset times at the preset time intervals. When the event is a battery charging event, the control unit 560 can determine a reconnection attempt time interval corresponding to the battery charging event. During the charging of the electronic device 450, the reconnection attempt time interval can vary according to the remaining battery capacity.

In step 911, it is determined whether the communication reconnection is successful. When the communication reconnection with the at least one external device 410 is successful, the control unit 560 proceeds to step 715 of FIG. 7. When the communication reconnection with the at least one external device 410 fails in operation 911, the control unit 560 returns to step 901.

FIG. 10 is a table showing a reconnection attempt condition with an external device when an electronic device is active, according to an embodiment of the present disclosure.

Referring to FIG. 8 and FIG. 10, the control unit 560 can determine the reconnection attempt time interval corresponding to the active application processor 620 in the step 807 of FIG. 8. When detecting the movement of the electronic device 450 according to the sensing information, for example, when the reconnection attempt condition is "moving" as shown in FIG. 10, the control unit 560 can determine that the communication reconnection attempt time interval with the external device 410 is 20 seconds.

When not detecting the movement of the electronic device 450 according to the sensing information, for example, when the reconnection attempt condition is "stationary" as shown in FIG. 10, the control unit 560 can determine that the communication reconnection attempt time interval with the external device 410 is 30 seconds. Thus, the reconnection attempt time interval can be altered by the manufacturer or the user. The control unit 560 can attempt the communication reconnection at the preset reconnection attempt time intervals for the preset reconnection times.

The communication reconnection attempt time interval with the at least one external device 410 is shown as determined according to, but is not limited to, the movement of the electronic device 450. For example, the control unit 560 can attempt the communication reconnection with the external device 410 at the communication reconnection attempt time intervals according to the moving speed of the electronic device 450.

Figure 11:
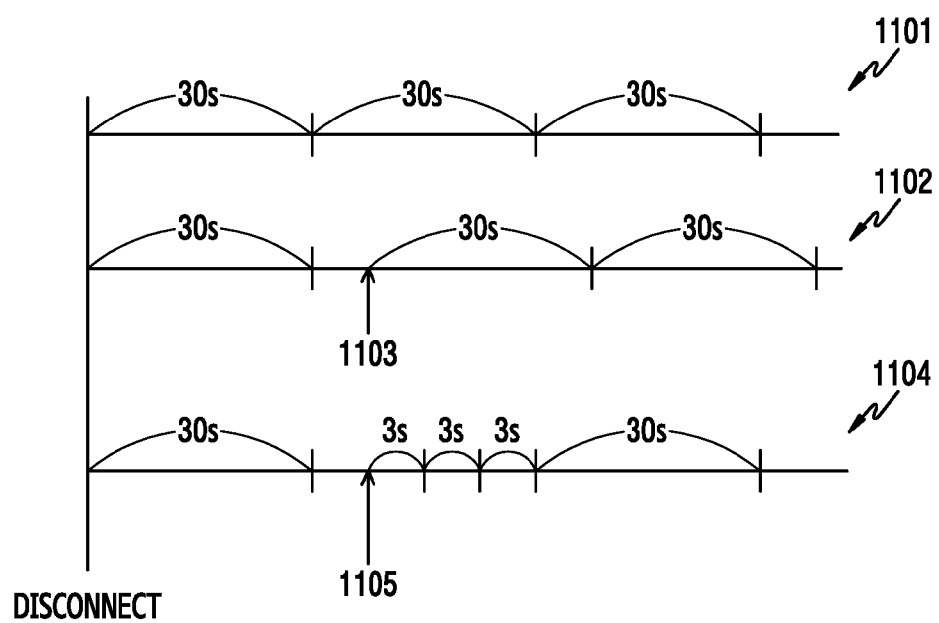
FIG. 11 is a diagram illustrating a reconnection attempt time with an external device in an electronic device, according to an embodiment of the present disclosure.

FIG. 11 is a diagram illustrating a reconnection attempt time with an external device in an electronic device, according to an embodiment of the present disclosure.

Referring to FIG. 11, when the application processor 620 is active and the reconnection attempt condition is "stationary", the control unit 560 can attempt the communication reconnection with the at least one external device 410 every 30 seconds after the disconnection as shown with respect to reference numeral 1101.

When an event occurs during the reconnection every 30 seconds, the control unit 560 can attempt a one-time communication reconnection with the at least one external device 410 at the point of the event occurrence 1103, as shown with respect to reference numeral 1102. When the one-time communication reconnection is attempted and the communication reconnection with the at least one external device 410 fails, the control unit 560 can reattempt the communication reconnection with the external device 410 every 30 seconds.

When an event occurs during the reconnection every 30 seconds, the control unit 560 can attempt the reconnection for the number of reconnection attempt times (e.g., three times) at reconnection attempt time intervals (e.g., three seconds) corresponding to the event occurrence 1105, as shown with respect to reference numeral 1104. When the communication reconnection fails due to the event, the control unit 560 can attempt the reconnection every 30 seconds after the communication reconnection failure. The reconnection attempt time interval and the number of reconnection attempts can vary according to the event type.

FIG. 12 is a table showing training data generated in an electronic device, according to an embodiment of the present disclosure.

Referring to FIG. 8 and FIG. 12, training data 1201, 1203, and 1205 are generated by accumulating communication reconnection data with the at least one external device 410.

First training data 1201 indicates that the electronic device 450 disconnected from the at least one external device 410 between 00:00 and 07:00 and the disconnection location is null. According to the first training data 1201, when the communication with the at least one external device 410 is interrupted between 00:00 and 07:00, the control unit 560 can attempt the communication reconnection with the external device 410 every four hours.

Second training data 1203 indicates that the electronic device 450 disconnected from the at least one external device 410 between 07:01 and 09:00 and the disconnection location is null. According to the second training data 1203, when the communication with the at least one external device 410 is interrupted between 07:01 and 09:00, the control unit 560 can attempt the communication reconnection with the external device 410 every one second.

Third training data 1205 indicates that the electronic device 450 disconnected from the at least one external device 410 between 14:00 and 16:00 and the disconnection location is A. According to the third training data 1205, when the communication with the external device 410 is interrupted between 14:00 and 16:00 and the disconnection location is A, the control unit 560 can attempt the communication reconnection with the external device 410 every three minutes. The location A can indicate an area of a critical radius based on particular coordinates of the electronic device 450 disconnected from the at least one external device 410. Thus, the control unit 560 can obtain its location from the sensing information of the sensor unit 530. The time and the location of the disconnection can form the reconnection attempt condition when the application processor 620 is active, as described above with respect to step 803 of FIG. 8.

For example, when the disconnection time of the external device 410 is 03:10, the control unit 560 attempts the communication reconnection with the external device 410 every four hours regardless of the disconnection location. When the disconnection time of the external device 410 is 07:10, the control unit 560 attempts the communication reconnection with the external device 410 every one second regardless of the disconnection location. When the disconnection time of the external device 410 is 15:10 and the disconnection location is A, the control unit 560 attempts the communication reconnection with the external device 410 every three minutes.

FIG. 13 is a table showing generation of training data in an electronic device, according to an embodiment of the present disclosure.

Referring to FIG. 12 and FIG. 13, the control unit 560 can store dates, times, and locations of the disconnection from the at least one external device 410. When completing the communication reconnection with the external device 410, the control unit 560 can store a time and a location of the completed reconnection.

When the disconnection time of the at least one external device 410 is 14:30:01 on June 15$^{th}$ and the disconnection location is A, the control unit 560 stores training data 1301 of FIG. 3 in the training data table. When the external device 410 is reconnected at 14:33:21 at the location A', the control unit 560 stores the remainder of training data 1301 of FIG. 13 in the training data table.

When the disconnection time of the external device 410 is 14:00:20 on June 16$^{th}$ and the disconnection location is A, the control unit 560 stores training data 1302 of FIG. 13 in the training data table. When the external device 410 is reconnected at 14:02:45 at the location A', the control unit 560 stores the remainder of training data 1302 of FIG. 13 in the training data table.

When the disconnection time of the external device 410 is 14:20:15 on June 17$^{th}$ and the disconnection location is A, the control unit 560 stores training data 1303 of FIG. 13 in the training data table. When the external device 410 is reconnected at 14:23:17 at the location A', the control unit 560 stores the remaining training data 1303 of FIG. 13 in the training data table.

After accumulating data over critical times (e.g., three times), the control unit 560 can confirm that the electronic device 450 disconnects from the at least one external device 410 between 14:00 and 14:30 and the disconnection location is A. Based on the accumulation, the control unit 560 can determine that an average reconnection time interval is about 2 minutes and 56 seconds and the reconnection location is A'. The control unit 560 can generate training data of FIG. 12 with the determined average time interval and location.

When the electronic device 450 is disconnected from the external device 410 at 15:15:30 on June 18$^{th}$ and the disconnection location is B, the control unit can store training data 1304 of FIG. 13 in the training data table. When the external device 410 is reconnected at 15:17:25 and the reconnection location is B', the control unit 560 can store training data 1304 of FIG. 13 in the training data table. Since there is no similar or identical training data to that of the training data 1304, the control unit 560 does not generate it as the training data.

The training data table can store only the disconnection time and the completed connection time. The reconnection complete condition can include at least one of the completed reconnection time and the completed reconnection location of the electronic device 450 and the at least one external device 410.

Figure 14:
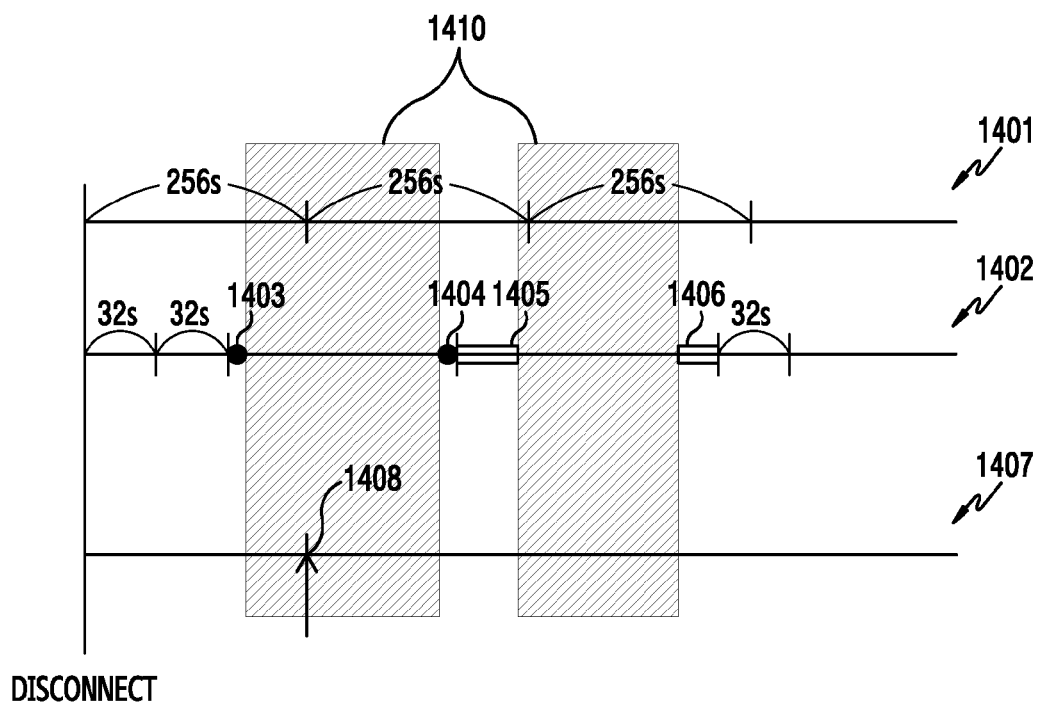
FIG. 14 is a diagram illustrating reconnection attempt timing with an external device based on a status of an electronic device, according to an embodiment of the present disclosure.

FIG. 14 is a diagram illustrating reconnection attempt timing with an external device according to a status of an electronic device, according to an embodiment of the present disclosure.

Referring to FIG. 14, the application processor 620 is sleeping with respect to reference numeral 1401. When the application processor 620 is sleeping, the control unit 560 can wake up the application processor 620 at time intervals of a constant multiple (1, 2, 4, 8, 16 . . . 256 seconds), and thus, attempt the communication reconnection with the at least one external device 410.

When not completing the communication reconnection by the communication reconnection at 256 seconds, which is the maximum constant multiple value, the control unit 560 can wake up the application processor 620 every 256 seconds, and thus, attempt the communication reconnection with the at least one external device 410. Thus, the control unit 560 can attempt the communication reconnection with the at least one external device 410 by switching the application processor 620 to the wakeup mode at the preset time intervals (e.g., 256 seconds) regardless of a sleep mode 1410 of the application processor 620.

The application processor 620 is active with respect to reference numeral 1402. When the application processor 620 is active, the control unit 560 can attempt the communication reconnection with the external device 410 every 32 seconds. When the application processor 620 enters the sleep mode 1410 during the communication reconnection attempt with the at least one external device 410, the control unit 560 can attempt the communication reconnection with the external device 410 every 32 seconds with additional times 1403 and 1405 before the sleep mode 1410, and times 1404 and 1406 after the sleep mode 1410.

Regardless of the sleep mode or the active mode of the application processor 620, an event 1408 occurs, with respect to reference numeral 1407, when the application processor 620 is in the sleep mode 1410. When the event 1408 occurs while the application processor 620 is in the sleep mode 1410, the control unit 560 can wake up the application processor 620 at the point of the event occurrence 1408, and thus, attempt the communication reconnection with the at least one external device 410.

Figure 15:
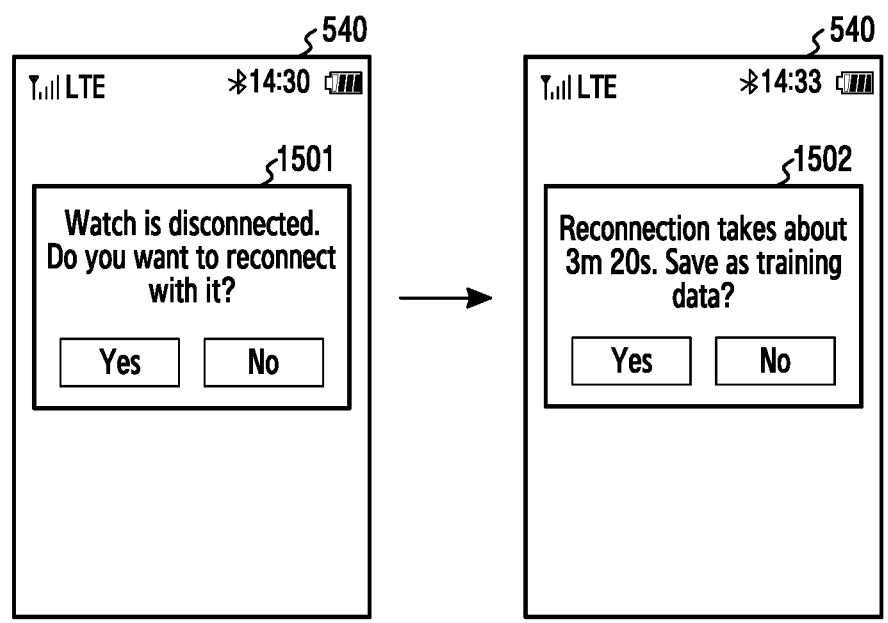
FIG. 15 is a diagram illustrating a screen for storing training data of an electronic device, according to an embodiment of the present disclosure.

FIG. 15 is a diagram illustrating a screen for storing training data of an electronic device, according to an embodiment of the present disclosure.

Referring to FIG. 15, when the at least one external device 410 (e.g., a smart watch) is disconnected, the control unit 560 can output a message 1501 notifying of the disconnection on the display unit 540. When the user selects YES, the control unit 560 can reconnect with the at least one external device 410. Upon completing the reconnection with the external device 410, the control unit 560 can display a message 1502 showing a time taken from the disconnection to the reconnection completion. When the user selects YES, the control unit 560 can store the data in the training data table of FIG. 13. The control unit 560 can generate the training data of FIG. 12 using the training data accumulated in the training data table.

A method for connecting with an external device 410 can include, determining a current status of an electronic device 450 when wireless communication with at least one external device 410 is disconnected, determining a preset time interval corresponding to the current status of the electronic device 450, and reconnecting with the external device 410 based on the determined time interval.

Determining the current status of the electronic device 410 can determine whether the current status is a sleep status or an active status. Determining the current status of the electronic device 450 can include, determining a reconnection attempt condition with the external device 410 in the active status, and determining whether there is training data corresponding to the reconnection attempt condition.

Determining the preset time interval can include determining a time interval corresponding to the training data.

The method can further include, reconnecting with the external device 410 based on a preset time interval when there is no training data, and storing the training data by mapping the reconnection attempt condition with a condition of completing the reconnection with the external device 410 when completing the reconnection with the external device 410.

The reconnection attempt condition can include at least one of a disconnection time and a disconnection location of the external device 410.

The reconnection complete condition can include at least one of a completed reconnection time and a completed reconnection location in relation to the external device 410.

The method can further include, determining whether the electronic device 450 moves in the active status, and determining a time interval corresponding to the movement.

The method can further include, reconnecting with the external device 410 according to the particular event when detecting a particular event.

The method can further include, reconnecting with the external device 410 according to the particular event when detecting a particular event during reconnection with the external device 410.

As set forth above, when the electronic device and the external device are unintentionally disconnected, the method and the apparatus presented herein for connecting with the external device can rapidly reconnect with the external device. Thus, time consumption and power consumption can be minimized, and user convenience can be enhanced.

While the disclosure has been shown and described with reference to certain embodiments thereof, it will be understood by those skilled in the art that various changes in form and detail may be made therein without departing from the spirit and scope of the disclosure as defined by the appended claims and their equivalents.

What is claimed is:

1. A method for connecting with an external device, comprising:
determining a current status of an application processor (AP) of an electronic device in response to detecting that wireless communication with at least one external device is disconnected;
determining a preset time interval during which the electronic device attempts to reconnect with the at least one external device, the preset time interval corresponding to the current status of the AP; and
attempting to reconnect with the at least one external device based on the preset time interval,
wherein determining the current status of the AP comprises:
determining whether the current status of the AP is a sleep status or an active status;
identifying a reconnection attempt condition for attempting to reconnect with the at least one external device, in response to determining that the current status of the AP is the active status; and
determining whether training data corresponding to the reconnection attempt condition exists, and
wherein determining the preset time interval comprises storing the training data by mapping the reconnection attempt condition with a reconnection complete condition when reconnection with the at least one external device is completed.

2. The method of claim 1, wherein determining the preset time interval comprises:
determining a time interval corresponding to the training data.

3. The method of claim 1, wherein the reconnection attempt condition comprises at least one of a disconnection time and a disconnection location of the at least one external device.

4. The method of claim 1, wherein the reconnection complete condition comprises at least one of a completed reconnection time and a completed reconnection location in relation to the at least one external device.

5. The method of claim 1, further comprising:
determining whether the electronic device moves in the active status; and
determining a time interval corresponding to movement of the electronic device.

6. The method of claim 1, further comprising:
attempting to reconnect with the at least one external device according to an event when the event is detected.

7. The method of claim 1, further comprising:
attempting to reconnect with the at least one external device according to an event, when the event is detected while attempting to reconnect with the at least one external device.

8. An electronic device comprising:
a communication unit configured to connect with at least one external device via wireless communication; and
a control unit configured to:
determine a current status of an application processor (AP) of the electronic device in response to detecting that a wireless connection with the at least one external device is disconnected;
determine a preset time interval during which the electronic device attempts to reconnect with the at least one external device, the preset time interval corresponding to the current status of the AP; and
attempt to reconnect with the at least one external device based on the preset time interval,
wherein the control unit is further configured to:

determine whether the current status of the AP is a sleep status or an active status;

identify a reconnection attempt condition for attempting to reconnect with the at least one external device, in response to determining that the current status of the AP is the active status;

determine whether training data corresponding to the reconnection attempt condition exists determine whether the current status is a sleep status or an active status; and store the training data by mapping the reconnection attempt condition with a reconnection complete condition when reconnection with the at least one external device is completed.

9. The electronic device of claim 8, wherein the control unit is configured to determine a time interval corresponding to the training data.

10. The electronic device of claim 8, wherein the reconnection attempt condition comprises at least one of a disconnection time and a disconnection location of the at least one external device.

11. The electronic device of claim 8, wherein the reconnection complete condition comprises at least one of a completed reconnection time and a completed reconnection location in relation to the at least one external device.

12. The electronic device of claim 8, wherein the control unit is further configured to:

determine whether the electronic device moves in the active status; and determine a time interval corresponding to movement of the electronic device.

13. The electronic device of claim 8, wherein the control unit is further configured to attempt to reconnect with the at least one external device according to an event when the event is detected.

14. The electronic device of claim 8, wherein the control unit is further configured to attempt to reconnect with the at least one external device according to an event, when the event is detected while attempting to reconnect with the at least one external device.

* * * * *